Figure 2:
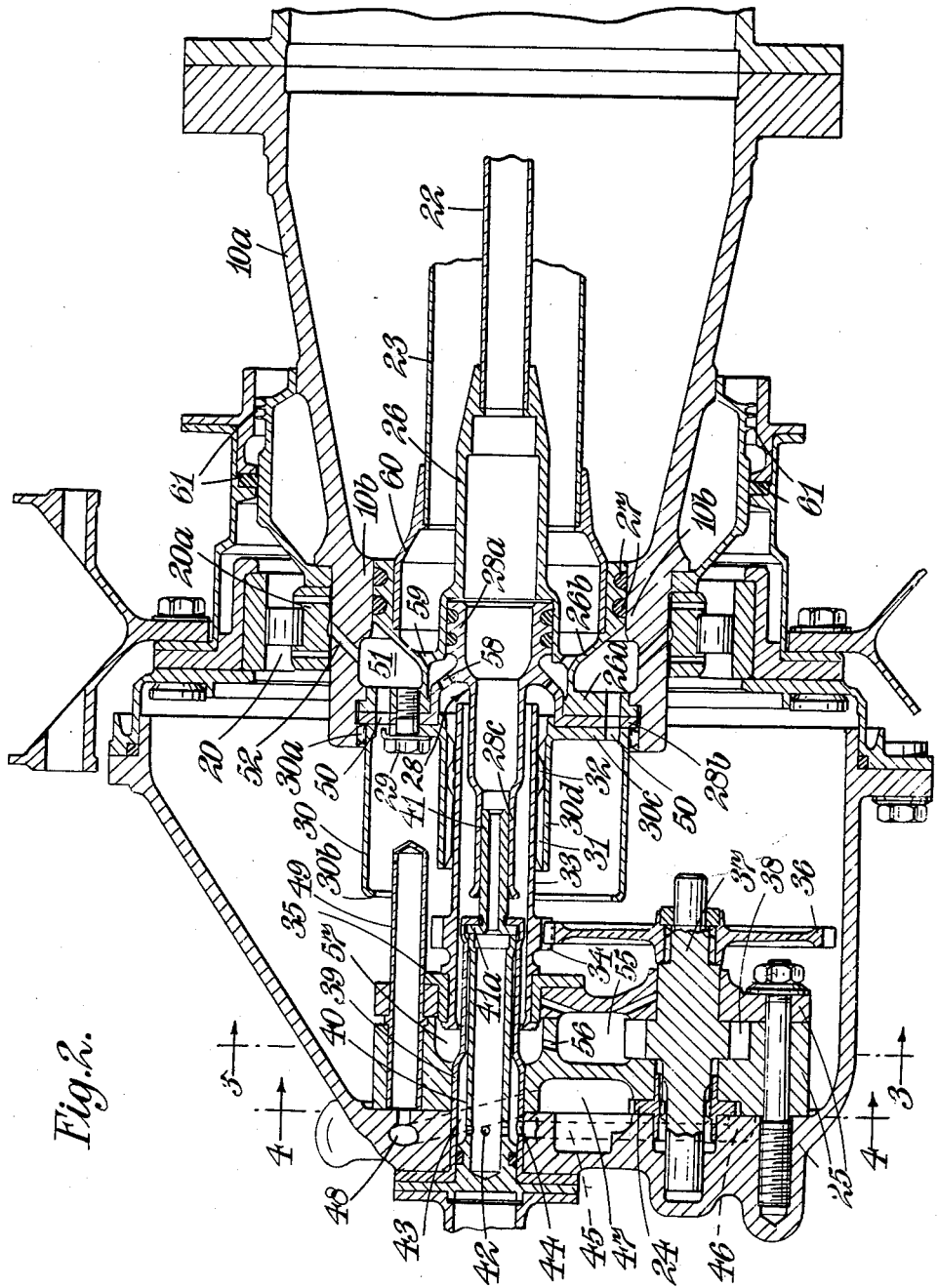

Jan. 29, 1963 A. BILL ET AL 3,075,349
LUBRICATING ARRANGEMENTS FOR BEARINGS IN ENGINES
Filed May 12, 1961 4 Sheets-Sheet 1
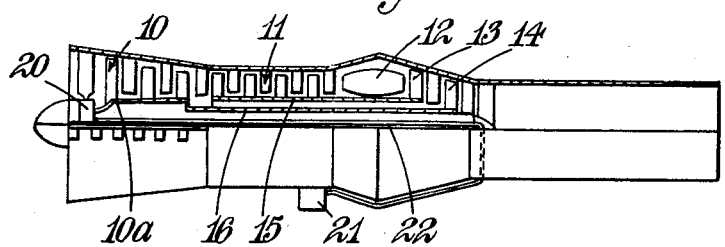
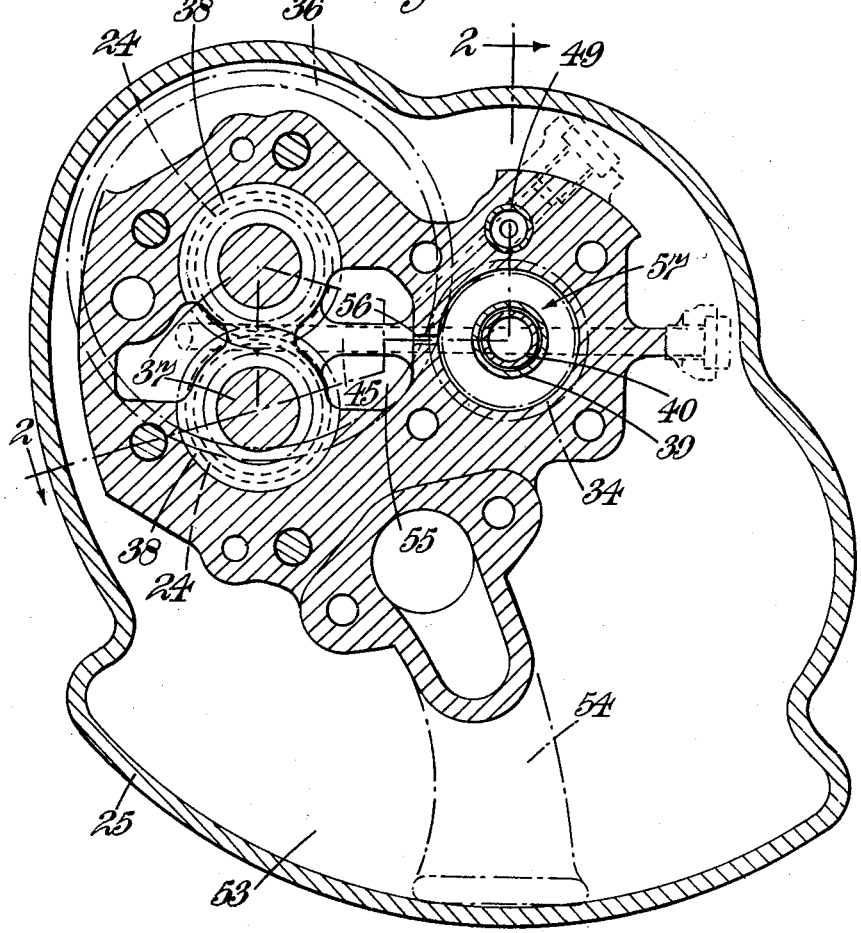

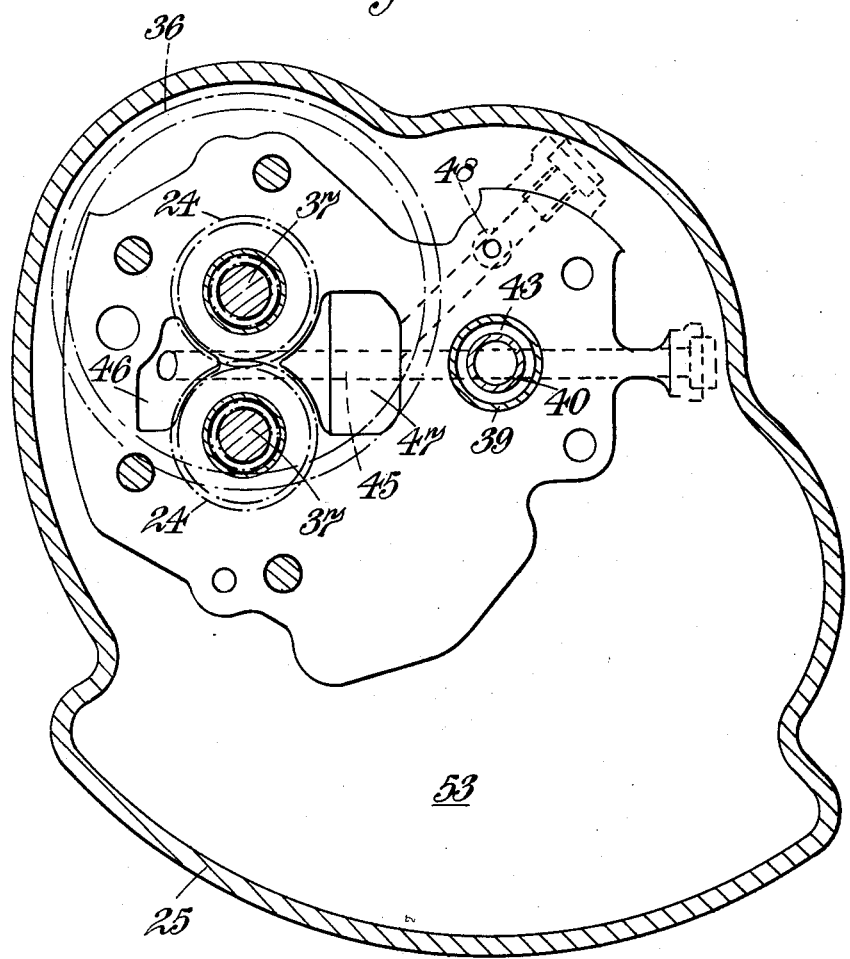

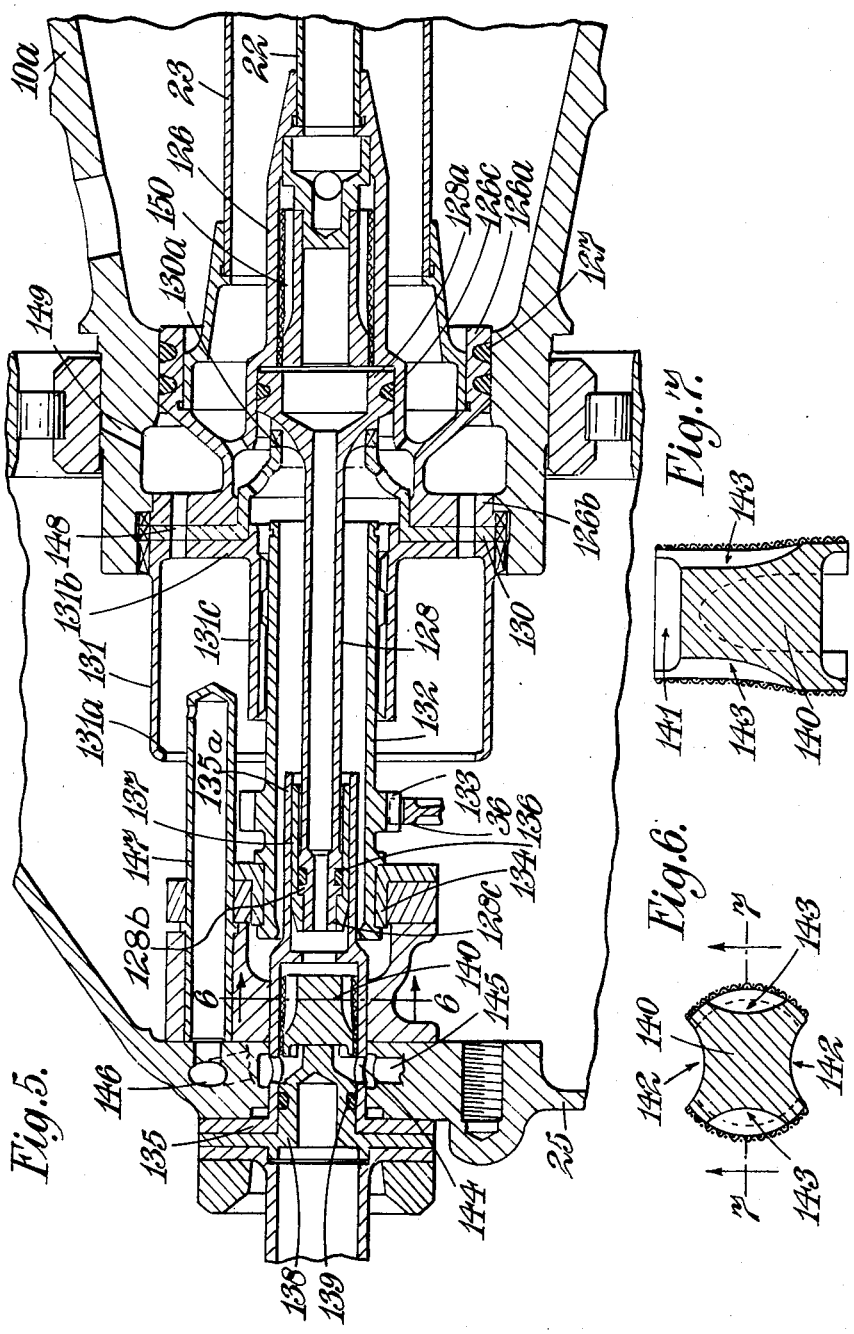

United States Patent Office 3,075,349
Patented Jan. 29, 1963

3,075,349
LUBRICATING ARRANGEMENTS FOR BEARINGS IN ENGINES
Arthur Bill, Derby, and Douglas Wilson Dawson, Shelton Lock, Derby, England, assignors to Rolls-Royce Limited, Derby, England, a British company
Filed May 12, 1961, Ser. No. 109,602
Claims priority, application Great Britain May 16, 1960
8 Claims. (Cl. 60—39.08)

This invention comprises improvements in or relating to lubricating arrangements for bearings in engines.

In gas turbine engines of the two spool kind, that is of the kind having independently rotating high-pressure and low-pressure rotors, it is usual to drive the lubricating oil pump from the high-pressure rotor since this is the rotor which is driven during starting of the engine. As a result there is a tendency for certain bearings to become flooded with oil due to the fact that oil is scavenged from the bearings by means of a pump driven by the low-pressure rotor which in starting has a very much lower speed than the driven high-pressure rotor. This invention has for an object to avoid such flooding.

According to the invention, a gas turbine engine of the two spool type has a lubricating arrangement including a main lubricant pump driven by the high-pressure rotor to deliver lubricating oil towards the bearings of the rotors, a scavenge pump driven by the low-pressure rotor to withdraw oil from adjacent a bearing of the engine and return the oil to the low-pressure side of the main pump, and a metering pump driven by the low-pressure rotor and connected in the oil supply path between the main pump and a bearing supplied by the pump.

With the arrangement of the invention, the metering pump controls the rate of flow of oil to the bearing associated with the scavenge pump and since both the metering pump and the scavenge pump are driven by the low-pressure rotor the delivery of an excess quantity of oil to the bearing is prevented.

Preferably the metering pump and scavenge pump are gear pumps and have the gear elements mounted on a common shaft journalled in stationary structure and driven through gearing from the low-pressure rotor.

In one arrangement the common shaft of the gear pumps carries a pinion which meshes with a further pinion carried on a hollow shaft journalled in stationary structure to be co-axial with a low-pressure rotor, there being a splined connection between the hollow shaft and the low-pressure rotor. Such an arrangement is particularly suitable when the oil supply and scavenge pumps leading to the bearing extend coaxially through one of the rotors, and in this case the hollow shaft may form part of the scavenge oil ducting and may have extending in it transfer member by which oil is transferred from the oil supply pipe to the stationary structure in which the metering and scavenge pumps are mounted.

Two practical arrangements in accordance with this invention will now be described by way of example with reference to the accompanying drawings in which:

FIGURE 1 illustrates diagrammatically a gas turbine engine with parts of the lubricating system, FIGURE 2 is an axial section through the front bearing of the engine and shows parts of the lubricating system supplying the front bearing, FIGURE 3 is a section on the line 3—3 of FIGURE 2 and shows the line 2—2 of section of FIGURE 2, FIGURE 4 is a section on the line 4—4 of FIGURE 2, FIGURE 5 is a view corresponding to FIGURE 2 showing modifications, FIGURE 6 is a section on the line 6—6 of FIGURE 5, and FIGURE 7 is a section on the line 7—7 of FIGURE 6.

The engine illustrated is of the two spool kind comprising a low-pressure compressor 10, a high-pressure compressor 11, combustion equipment 12, a high-pressure turbine 13 and a low-pressure turbine 14 connected in series flow, the high-pressure compressor 11 being driven by the high-pressure turbine 13 through a hollow shaft 15 and the low-pressure compressor 10 being driven by the low-pressure turbine 14 through a shaft 16 extending co-axially through the high-pressure rotor assembly.

The rotors of the engine are supported by a number of bearings at axially-spaced positions, and the bearings include a front bearing 20 (FIGURE 2) supporting the forward end of the low-pressure compressor rotor 10a.

Lubricating oil is fed to the bearings by a main oil pump 21 (FIGURE 1) which is driven from the high-pressure rotor assembly, and in order to prevent damage to the oil supply system leading to the front bearing 20 by debris carried into the intake of the low-pressure compressor 10, it is arranged that the oil is conveyed to and from the bearing 20 by ducting 22 extending co-axially within the low-pressure compressor rotor 10a. In FIGURE 2, the oil supply pipe 22 is shown co-axially within the oil scavenge pipe 23.

The difficulty arises in connection with lubricating systems having the main pump 21 driven by the high-pressure rotor, that under some operating conditions, for instance during starting, an excess of oil tends to be delivered to the front bearing 20.

There is provided, therefore, means to meter the lubricating oil to the front bearing 20 comprising a pump connected between the main pump 21 and the bearing, which metering pump is driven by the low-pressure compressor 10.

In the arrangement illustrated in FIGURES 2 to 4, the metering pump is a gear pump 24 and it is mounted in fixed structure 25 close to the front bearing 20.

The oil supply pipe 22 terminates in an end fitting 26 mounted in the low-pressure compressor rotor 10a level with the bearing 20, the fitting having a first flange 26a which has a splined connection with the rotor 10a, and a second flange 26b, carrying seals 27 sealing against a cylindrical land 10b internally of the rotor 10a. The oil flows from pipe 22 through the fitting 26 into a transfer member 28 having a boss 28a seated in a recess in the fitting 26, a flange 28b having a splined connection with the rotor 10a, and an axial tubular extension 28c.

The flanges 26a, 28b, are secured to the rotor 10a by bolts 29 which also secure in position an oil distributor 30. The distributor 30 is tubular and has at one end a splined connection 30a with the rotor 10a, a narrow inturned flange 30b at its opposite end which is remote from the rotor 10a, and a wider flange 30c at the one end. The wider flange 30c has a tubular extension 30d at its inner edge, and this extension has internal splines 31 engaging external splines 32 on a short hollow shaft 33 surrounding but spaced radially from the tubular extension 28c of the transfer member.

The shaft 33 carries a pinion 34 and is supported by plain bearing 35 in the fixed structure 25. The pinion 34 meshes with a further pinion 36 mounted on a shaft 37 journalled in the fixed structure 25 and the shaft 37 carries one element of a scavenging gear pump 38 and also has mounted on it one element of the metering gear pump 24.

The fixed structure 25 has a pair of nested tubes 39, 40 secured in it co-axially with the tubular extension 28c of the transfer member, the ends of the tubes 39, 40 being spaced axially from the end of the extension 28c. These ends of the tubes 39, 40 have sandwiched between them a flange 41a formed on a transfer tube 41 which projects across the gap between the two tubes 39, 40 and the extension 28c and engages with a running fit in the bore of the tubular extension 28c.

Thus oil from the supply pipe 22 flows through the fitting 26, the transfer member 28a, 28c and transfer tube 41 into the inner tube 40.

The oil flows from tube 40 through holes 42 into an annular space 43 bounded by the tubes 39, 40 and then through hole 44 in the tube 39 into a duct 45 leading to an entry chamber 46 (FIGURE 2) for the metering pump 24. The oil is delivered by the metering pump into chamber 47 from which it flows through duct 48 to the inlet end of a delivery nozzle 49 which is in the form of a tube mounted in the fixed structure 25 to project into the distributor 30.

The oil is delivered by the nozzle 49 onto the internal surface of the distributor 30 which is rotating and the oil forms an annular layer in the trough defined by the flanges 30b, 30c until the oil level is sufficient to allow the oil to flow through holes 50 in the flanges 30c, 28b, 26a into chamber 51 from which the oil is distributed by drillings 52 to the inner race 20a of the bearing 20.

The oil after flowing over the bearing 20 collects in a sump 53 (FIGURE 3) in the fixed structure 25, is drawn from the sump through a suction pipe 54 by scavenge pump 38 and is delivered by the pump 38 into chamber 55. From chamber 55 the oil flows through holes 56 into space 57 which is in communication with one end of the hollow shaft and then flows in the shaft 33 to its opposite end to be delivered through ports 58, 59 into the scavenge pipe 23 which has a fitting 60 at its end in sealed engagement with the seal carrying flange 26b of the fitting 26.

Since the metering pump 24 and scavenge pump 38 are driven at the same speed by the low-pressure rotor 10a, the rate of delivery of lubricant to the bearing 20 is never such that the sump 53 is over-filled. Thus leakage of oil into the compressor 10 is avoided. However, running seals 61 are provided between the fixed structure 25 and the rotor 10a so that the sump 53 is closed off from the remainder of the engine.

Referring now to FIGURE 5, there is illustrated a modified form of oil transfer from the oil supply pipe 22 in the rotor 10a to the stationary structure, and from the stationary structure to the oil scavenge pipe 23.

The pipe 22 has a tubular end fitting 126 having a flange 126a carrying seals 127 engaging the bore of the rotor 10a, and a flange 126b having a splined engagement with the rotor 10a, the bore of the fitting 126 being stepped and in its largest diameter portion 126c being engaged by a head 128a on the end of transfer tube 128. The head 128a carries a sealing ring co-operating with the surface of the bore 126c. The bore of the fitting 126 also houses a filter arrangement 150.

The transfer tube 128 is backed by a ring 130 which has a splined engagement with the rotor 10a and at 130a with the transfer tube 128 and by a distributor 131 which has a narrow flange 131a at one end and a deep flange 131b bearing against the ring 130.

The distributor 131 has a splined engagement with the rotor 10a and through a tubular flange 131c with a shaft 132. The shaft 132 carries a pinion 133 by which the metering and scavenge pumps are driven as described with reference to FIGURES 1 to 4. The end of the shaft 132 remote from the rotor 10a is supported in a plain bearing 134 mounted beyond the end of a filter housing 135 carried by the stationary structure 25.

The transfer tube 128 adjacent its end remote from the rotor 10a has an enlarged diameter portion 128b carrying a sealing ring 136 fitting in the bore of a tubular bushing 137 fitted in an extension 135a of the filter housing 135, and the end 128c of the transfer tube 128 is squared to engage a correspondingly shaped portion of the bore of the bush 137.

The filter housing 135 is closed at its end remote from the rotor 10a by a plug 138 which is fitted with a sealing ring 139, and the housing 135 accommodates a filter element 140 (FIGURES 5, 6 and 7). The filter element 140 fits with slight clearance in the housing 135 and has a recess 141 at its end facing the transfer tube 128 and a series of four external channels, two 142 of which extend from the recess 141 part way to the opposite end of the element 140 and two 143 of which extend from the opposite end of the element 140 part way towards the recess 141.

Oil flowing from the transfer tube 128 flows past the filter element 140 to ports 144 leading to a duct 145 leading to the metering pump. Oil from this pump flows through a duct 146 to a delivery nozzle 147 projecting into the distributor 131 whence the oil flows to the bearing through holes 148 and drillings 149.

Scavenge oil is fed as described with reference to FIGURES 1 to 4 to the interior of the shaft 132 and thence to the scavenge oil pipe 23.

We claim:
1. A gas turbine engine having
  (a) a low-pressure rotor,
  (b) an independently rotating high-pressure rotor,
  (c) stationary structure,
  (d) bearings supporting the rotors in said stationary structure, and
  (e) a lubricating arrangement supplying lubricant to said bearings and comprising
    ($e_1$) a main lubricant pump driven from said high-pressure rotor and delivering lubricant to a supply path leading to one of the bearings,
    ($e_2$) a sump which collects lubricant drained from said one of the bearings,
    ($e_3$) a scavenge pump driven from said low-pressure rotor and withdrawing lubricant from said sump and connected to deliver to the inlet side of said main pump, and
    ($e_4$) a metering pump driven from the low-pressure rotor and connected in said supply path between the main pump and said one of the bearings, thereby to meter the supply to said bearing in dependence upon the rotational speed of the low-pressure rotor.

2. A gas turbine engine according to claim 1, the metering pump and the scavenge pump being gear pumps and having coaxial gear elements, there being a common shaft journalled in said stationary structure and carrying said coaxial gear elements, and gearing drivingly connecting said shaft to the low-pressure rotor.

3. A gas turbine engine according to claim 2, said gearing comprising a pinion on the common shaft, a hollow shaft journalled in said stationary structure to be coaxial with the low-pressure rotor, a further pinion carried on said hollow shaft and meshing with first said pinion, and a splined connection between the hollow shaft and the low-pressure rotor.

4. A gas turbine engine according to claim 3, comprising a lubricant supply pipe leading to said one of the bearings and a scavenge pipe leading from said scavenge pump, said pipes extending coaxially in one of the rotors, said hollow shaft delivering lubricant to the scavenge pipe.

5. A gas turbine engine according to claim 4, comprising transfer means extending in said hollow shaft and conveying lubricant from the supply pipe to the stationary structure, the metering pump and the scavenge pump being accommodated in said stationary structure.

6. A gas turbine engine according to claim 5, further comprising a tubular fitting secured on an end of the supply pipe and rotatively connected with said one of the rotors, and said transfer means comprising a transfer member having sealed engagement with said tubular fitting and also having a tubular extension projecting into said hollow shaft, the tubular extension communicating at one end through said fitting with the supply pipe, a transfer tube, said tubular extension at its other end and one end of the transfer tube engaging with a running fit, a tube secured in the stationary structure and connected with the transfer tube at its other end.

7. A gas turbine engine according to claim 5, further comprising a tubular fitting secured on an end of the supply pipe and rotatively connected with said one of the rotors, and said transfer means comprising a transfer tube extending within the hollow shaft, said transfer tube at one end having sealed engagement with the fitting and communicating through the fitting with the supply pipe, and said transfer tube being rotatable with said one of the rotors, a tubular bushing sealingly mounted on the other end of said transfer tube, said tubular bushing being rotatively engaged in the stationary structure.

8. A gas turbine engine according to claim 7, said transfer means comprising filter means in the lubricant path adjacent at least one end of the transfer member.

References Cited in the file of this patent

UNITED STATES PATENTS

| | | |
|---|---|---|
| 2,460,283 | Gooch | Feb. 1, 1949 |
| 2,607,328 | Jencick | Aug. 19, 1952 |
| 2,866,522 | Morley et al. | Dec. 30, 1958 |